United States Patent
Chu et al.

(10) Patent No.: US 11,508,266 B2
(45) Date of Patent: Nov. 22, 2022

(54) FLEXIBLE PANEL, MANUFACTURING METHOD THEREOF AND DISPLAY APPARATUS

(71) Applicant: BOE Technology Group Co., Ltd., Beijing (CN)

(72) Inventors: Shangchieh Chu, Beijing (CN); Yonghong Zhou, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 176 days.

(21) Appl. No.: 16/759,551

(22) PCT Filed: Sep. 25, 2019

(86) PCT No.: PCT/CN2019/107770
§ 371 (c)(1),
(2) Date: Apr. 27, 2020

(87) PCT Pub. No.: WO2020/098392
PCT Pub. Date: May 22, 2020

(65) Prior Publication Data
US 2021/0209971 A1    Jul. 8, 2021

(30) Foreign Application Priority Data
Nov. 12, 2018 (CN) .......................... 201811341628.2

(51) Int. Cl.
*G09F 9/30* (2006.01)
*G06F 1/16* (2006.01)
*G06F 1/18* (2006.01)

(52) U.S. Cl.
CPC ............ *G09F 9/301* (2013.01); *G06F 1/1652* (2013.01); *G06F 1/181* (2013.01)

(58) Field of Classification Search
CPC ........ G09F 9/301; G06F 1/1652; G06F 1/181; G06F 1/1626; G06F 1/1656
See application file for complete search history.

(56) References Cited

U.S. PATENT DOCUMENTS 9,793,512 B2    10/2017    Choi et al.
2013/0169515 A1    7/2013    Prushinskiy et al.
(Continued)

FOREIGN PATENT DOCUMENTS

CN    201464759 U    5/2010
CN    103928398 A    7/2014
(Continued)

OTHER PUBLICATIONS

First Office Action dated Nov. 28, 2019 for application No. CN201811341628.2 with English Translation attached.
(Continued)

*Primary Examiner* — James Wu
*Assistant Examiner* — Hung Q Dang
(74) *Attorney, Agent, or Firm* — Nath, Goldberg & Meyer; Joshua B. Goldberg

(57) ABSTRACT

The present disclosure provides a flexible panel, a manufacturing method thereof and a display apparatus. The flexible panel includes a substrate, and the substrate includes a display region, a frame region and a bendable region, the frame region surrounding the display region and disposed at the periphery of the display region, the bendable region disposed on a side of the frame region distal to the display region and abutting on the frame region, at least one groove is disposed in the substrate and recessed from a side surface of the substrate at an edge of the frame region, and respectively provided at at least one end of a boundary between the frame region and the bendable region, and one end of an
(Continued)

orthographic projection of the groove on the substrate coincides with one end of the boundary.

19 Claims, 2 Drawing Sheets

(56) References Cited

U.S. PATENT DOCUMENTS

| | | |
|---|---|---|
| 2017/0045914 A1 | 2/2017 | Namkung et al. |
| 2018/0011514 A1* | 1/2018 | Yoo ....................... G06F 1/1652 |

FOREIGN PATENT DOCUMENTS

| | | |
|---|---|---|
| CN | 205229608 U | 5/2016 |
| CN | 106450024 A | 2/2017 |
| CN | 106782088 A | 5/2017 |
| CN | 106887447 A | 6/2017 |
| CN | 107068862 A | 8/2017 |
| CN | 107221606 A | 9/2017 |
| CN | 107610593 A | 1/2018 |
| CN | 107665641 A | 2/2018 |
| CN | 107787260 A | 3/2018 |
| CN | 109192078 A | 1/2019 |

OTHER PUBLICATIONS

Second Office Action dated Jun. 2, 2020 for application No. CN201811341628.2 with English Translation attached.

* cited by examiner

FLEXIBLE PANEL, MANUFACTURING METHOD THEREOF AND DISPLAY APPARATUS

This is a National Phase Application filed under 35 U.S.C. 371 as a national stage of PCT/CN2019/107770, filed Sep. 25, 2019, an application claiming the benefit of Chinese Application No. 201811341628.2, filed Nov. 12, 2018, the content of each of which is hereby incorporated by reference in its entirety.

TECHNICAL FIELD

The present disclosure relates to the field of display technology, and in particular, to a flexible panel, a manufacturing method thereof and a display apparatus.

BACKGROUND

At present, in order to reduce a width of a frame of a flexible display screen, part of the frame is usually bent to the back of the screen. For example, a frame region for setting circuits is bent to the back of the screen.

At present, a boundary edge between the bending part and the other frame region which will not be bent is usually formed by laser cutting, but laser cutting easily causes damage such as a notch or crack to the boundary edge. After the bending part is bent, the notch or crack on the boundary edge is aggravated under the bending stress, which deteriorates the reliability of the flexible display screen.

SUMMARY

For at least partially solving the technical problems in the related art, the present disclosure provides a flexible panel, a manufacturing method thereof and a display apparatus.

According to one aspect of the present disclosure, a flexible panel is provided, and includes a substrate, and the substrate includes a display region, a frame region and a bendable region, with the frame region surrounding the display region and disposed at the periphery of the display region, and the bendable region disposed on a side of the frame region distal to the display region and abutting on the frame region, wherein, at least one groove is disposed in the substrate and recessed from a side surface of the substrate at an edge of the frame region, and respectively provided at at least one end of a boundary between the frame region and the bendable region, and one end of an orthographic projection of the groove on the substrate coincides with one end of the boundary.

In some embodiments, the substrate includes a display surface and a non-display surface opposite to the display surface, and a protection layer is provided on the non-display surface of the substrate; and the protection layer extends to the groove at the edge of the substrate.

In some embodiments, the orthographic projection of the groove on the substrate entirely falls within an orthographic projection of the protection layer on the substrate.

In some embodiments, the groove extends from the display surface to the non-display surface of the substrate along a direction parallel to a thickness direction of the substrate.

In some embodiments, a bottom of the groove is opposite to an opening thereof, and a depth direction of the groove from the opening to the bottom is parallel to an arrangement direction in which the frame region and the bendable region are arranged on the substrate.

In some embodiments, the bottom of the groove is curved.

In some embodiments, a depth of the groove is greater than or equal to 0.5 mm and less than 2 mm.

In some embodiments, a width of the opening of the groove is greater than or equal to 0.5 mm and less than 2 mm.

In some embodiments, a material of the protection layer includes polyethylene terephthalate, polycarbonate, polyethylene, polyvinyl chloride, polystyrene, polypropylene or nylon.

In some embodiments, the substrate further includes a driving and bonding region disposed on a side of the bendable region distal to the frame region and abutting on the bendable region; and the bendable region is configured to bend towards a side of the non-display surface of the substrate such that the driving and bonding region is positioned at the side of the non-display surface.

In some embodiments, a part of the protection layer is provided on the non-display surface of the driving and bonding region, and the protection layer is not provided at the non-display surface of the bendable region.

In some embodiments, a plurality of holes are provided in the bendable region along a direction perpendicular to the depth direction.

In some embodiments, the plurality of holes are elliptical, and a long axis direction of the elliptical holes is parallel to the depth direction.

According to another aspect of the present disclosure, a display apparatus is provided, and includes the above flexible panel.

According to another aspect of the present disclosure, a manufacturing method of the above flexible panel is provided, and includes cutting the end of the frame region from the side surface of the substrate by laser cutting to form the at least one groove.

In some embodiments, the manufacturing method further includes attaching the protection layer to the non-display surface of the substrate.

In some embodiments, after attaching the protection layer, the manufacturing method further includes bending the bendable region towards the side of the non-display surface of the substrate.

DETAILED DESCRIPTION

In order to enable those skilled in the art to better understand the technical solutions of the present disclosure, a flexible panel, a manufacturing method thereof and a display apparatus provided by the present disclosure are further described in detail below with reference to the accompanying drawings and the specific embodiments.

Figure 1:
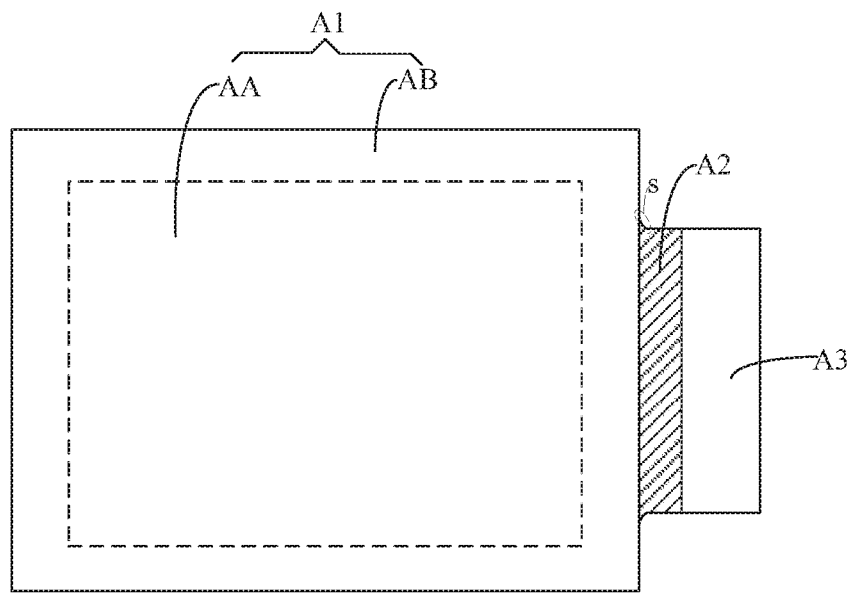
FIG. 1 is a top view of a structure of a flexible display screen according to an exemplary embodiment of the present disclosure.

According to one aspect of the present disclosure, a flexible display screen is provided. As shown in FIG. 1, the flexible display screen is divided into three regions: a region A1 including a display region AA, and a frame region AB surrounding the display region AA and disposed at the periphery of the display region AA; a region A2 which is a bendable region; and a region A3 for setting a driving chip and a bonding circuit. The width of the flexible display screen is reduced in the regions A2 and A3. In the design of bending the region A3 to the back of the flexible display screen, a boundary edge s between the region A2 and the frame region AB which will not be bent is generally formed into a curved line by laser cutting.

However, in the exemplary embodiment, since the intensity of the laser applied to the boundary edge s is unstable during the laser cutting, a small crack or notch may be generated at the curved boundary edge s, and is easily aggravated under the action of the bending stress generated after the region A2 is bent, which may deteriorate the reliability of the flexible display panel.

In order to solve the above problems in the exemplary embodiment, the present disclosure provides other technical solutions below.

Figure 2:
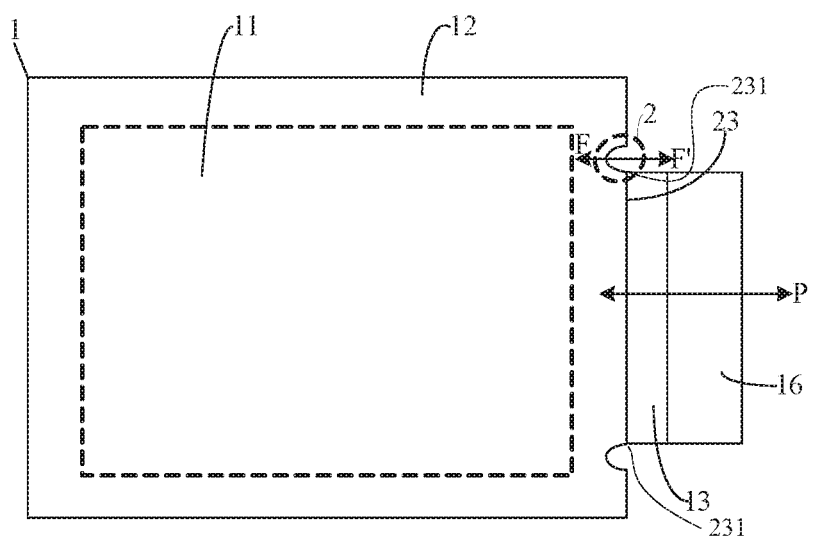
FIG. 2 is a top view of a structure of a flexible panel according to another exemplary embodiment of the present disclosure.
Figure 3:
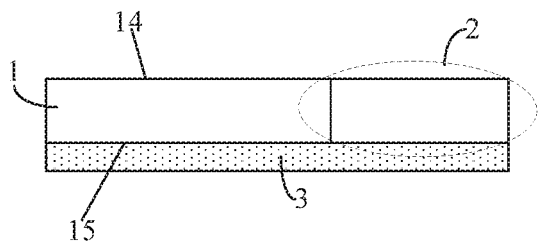
FIG. 3 is a cross-sectional view of a structure of the flexible panel in FIG. 2 taken along a section line F-F'.
Figure 4:
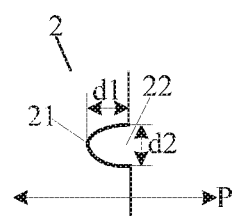
FIG. 4 is a top view of a structure of a groove in the flexible panel in FIG. 2.

According to another aspect of the present disclosure, a flexible panel is provided. As shown in FIG. 2 to FIG. 4, the flexible panel includes a substrate 1, the substrate 1 includes a display region 11, a frame region 12 and a bendable region 13, the frame region 12 surrounds the display region 11, is disposed at the periphery of the display region 11, and abuts on the display region 11, the bendable region 13 is disposed on a side of the frame region 12 distal to the display region 11 and abuts on the frame region 12, a groove 2 is formed in the substrate and recessed from a side surface of the substrate 1 in the frame region 12 and is located at one end 231 (for example, as shown in FIG. 2, there are two ends 231 in the exemplary embodiment) of a boundary 23 between the frame region 12 and the bendable region 13, and one end of an orthographic projection of the groove 2 on the substrate 1 coincides with an end 231 of the boundary 23. It should be understood that, as shown in FIG. 2, two ends 231 of the boundary 23 refer to the two endpoints of the boundary 23.

In the exemplary embodiment of the present disclosure, the orthographic projection of the groove 2 on the substrate 1 is a curve, one end of the curve coincides with one end 231 of the boundary 23, that is, the groove 2 disposed in the frame region 12 of the substrate 1 is connected with the bendable region 13 at the boundary between the frame region 12 and the bendable region 13 (that is, at one of the two ends 231 of the boundary 23).

By providing the grooves 2 at the two ends 231 of the boundary 23 between the frame region 12 and the bendable region 13 on the end surface of the edge of the substrate 1 in the frame region 12, the inevitable small laser-cut cracks or notches can be mostly formed on a wall portion of the groove 2 while forming the boundary edges between the frame region 12 and the bendable region 13 by laser cutting, thereby reducing the number of the small cracks or notches formed at the boundary edges of the bendable region 13. After the bendable region 13 is bent, overall aggravation of the small cracks or notches at the boundary edges of the bendable region 13 under the action of bending stress can be reduced accordingly, and the small cracks or notches formed on the wall portions of the grooves 2 receive relatively small bending stress, thereby improving the reliability of the flexible panel.

In the exemplary embodiment of the present disclosure, the substrate 1 includes a display surface 14 and a non-display surface 15 opposite to the display surface 14, and a protection layer 3 is provided on the non-display surface 15 of the substrate 1 and extends to the groove 2 at the edge of the substrate 1. In the exemplary embodiment of the present disclosure, the material of the protection layer 3 includes polyethylene terephthalate (PET), polycarbonate (PC), polyethylene (PE), polyvinyl chloride (PVC), polystyrene (PS), polypropylene (PP), or nylon.

In the exemplary embodiment of the present disclosure, the orthographic projection of the groove 2 on the substrate 1 entirely falls within a range of an orthographic projection of the protection layer 3 on the substrate 1. That is, the protection layer 3 completely covers an end surface of the groove 2 at the side of the non-display surface 15.

The protection layer 3 has certain flexibility and can support and reinforce the groove 2, so that the small cracks or notches on the wall portion of the groove 2 will not be further aggravated under the action of the bending stress of the bendable region 13, thereby improving the reliability of the flexible panel.

In the exemplary embodiment of the present disclosure, the groove 2 extends from the display surface 14 to the non-display surface 15 of the substrate 1 along a direction parallel to a thickness direction of the substrate 1. That is, the groove 2 passes through the substrate 1 in the thickness direction thereof. Generally, the groove 2 is formed by laser cutting to pass through the substrate 1 in the thickness direction thereof. The groove 2 with such a structure can better reduce or avoid aggravation of the small cracks or notches on the wall portion of the groove 2 under the bending stress of the bendable region 13.

In the exemplary embodiment of the present disclosure, a bottom 21 of the groove 2 is opposite to an opening 22 thereof, and a depth direction of the groove 2 from the opening 22 to the bottom 21 is parallel to an arrangement direction P in which the frame region 12 and the bendable region 13 are located on the substrate 1.

Since a laser spot has a certain size and has a spot trajectory of limited control accuracy, a cut actually obtained may deviate from an expected one to a certain extent when a relatively small region is cut, for example, small cracks or notches may be generated. By setting the bottom 21 of the groove 2 opposite to the opening 22 thereof and setting the depth direction of the groove 2 from the opening 22 to the bottom 21 parallel to the arrangement direction P of the frame region 12 and the bendable region 13 on the plane where the substrate 1 is located, the inevitable small laser-cut cracks or notches can be mostly formed on the wall of the groove 2 on the end surface of the edge of the substrate 1 in the frame region 12 while forming the boundary between the frame region 12 and the bendable region 13 by laser cutting, thereby reducing the number of the small cracks or notches formed at the boundary of the bendable region 13; in addition, the depth direction of the groove 2 is parallel to the arrangement direction P of the frame region 12 and the bendable region 13 on the plane where the substrate 1 is located, so that, after the bendable region 13 is bent, the small cracks or notches formed on the wall of the groove 2 receive relatively small bending stress, and the overall aggravation of the small cracks or notches at the boundary edges of the bendable region 13 can be reduced correspondingly under the action of the bending stress, thereby improving the reliability of the flexible panel. It should be understood that, the depth direction of the groove 2 from the opening 22 to the bottom 21 is not limited to being parallel to the arrangement direction P of the frame region 12 and the bendable region 13 on the plane where the substrate 1 is located, the depth direction of the groove 2 from the opening 22 to the bottom 21 may also be, for example, obliquely upward, that is, a direction obtained by rotating the arrangement direction P shown in FIG. 2 upwards at an angle between 0° and 900.

In the exemplary embodiment of the present disclosure, a bottom surface of the groove 2 is curved. That is, in any section perpendicular to the thickness direction of the substrate 1, the line cut on the bottom surface of the groove 2 is an arc, for example, in any section perpendicular to the thickness direction of the substrate 1, the arc cut on the bottom surface of the groove 2 is a circular arc. Thus, since there is objective instability when the laser cutting is applied to a relatively small region, the process deviation of forming the groove 2 by laser cutting is reduced compared with the case that the lines cut on the bottom surface of the groove 2 are straight lines intersecting at right angles in any section perpendicular to the thickness direction of the substrate 1, so that both the number and the aggravation of the small cracks or notches formed on the wall portion of the groove 2 during the laser cutting can be accordingly reduced, thereby improving the reliability of the flexible panel when the bendable region 13 is bent.

In the exemplary embodiment of the present disclosure, a depth d1 of the groove 2 is greater than or equal to 0.5 mm and less than 2 mm. An opening width d2 of the groove 2 is greater than or equal to 0.5 mm and less than 2 mm. 0.5 mm is the minimum cutting size that can be achieved when the groove 2 is formed by laser cutting. With the groove 2 in such structural size, on the one hand, a conductive circuit in the frame region 12 will not be cut by mistake when the groove 2 is formed by laser cutting; on the other hand, the width of the frame region 12 will not be increased by setting the groove 2, which facilitates realizing a narrow frame of the flexible panel.

In the exemplary embodiment of the present disclosure, the substrate 1 further includes a driving and bonding region 16 which is disposed on a side of the bendable region 13 distal to the frame region 12 and abuts on the bendable region 13; the bendable region 13 is configured to be bent towards the non-display surface 15 side of the substrate 1, so as to position the driving and bonding region 16 on the non-display surface 15 side. A driving chip and a bonding circuit are disposed in the driving and bonding region 16. Bending the driving and bonding region 16 to the non-display surface 15 side of the substrate 1 facilitates realizing a narrow frame of the flexible panel.

In the exemplary embodiment of the present disclosure, the non-display surface 15 side of the driving and bonding region 16 is provided with the protection layer 3, and the non-display surface 15 side of the bendable region 13 is not provided with the protection layer 3. Since the protection layer 3 has certain flexibility, the protection layer 3 provided in the driving and bonding region 16 can support and reinforce the driving and bonding region 16. Since the bendable region 13 is to be bent, it can facilitate bending the bendable region 13 that the bendable region 13 is not provided with the protection layer 3.

Figure 5:
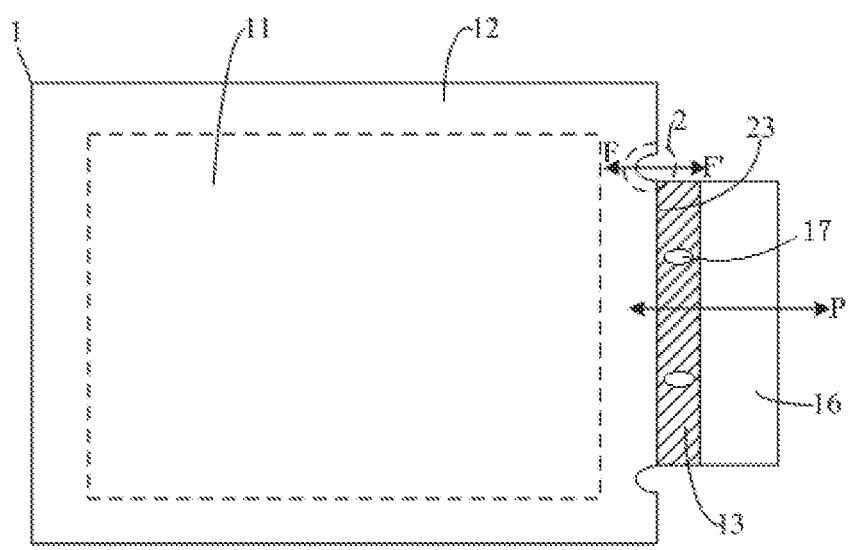
FIG. 5 is a top view of a structure of a flexible panel according to another exemplary embodiment of the present disclosure.

In the exemplary embodiment of the present disclosure, as shown in FIG. 5, a plurality of holes 17 are provided in the bendable region 13 along a direction perpendicular to the depth direction (or the arrangement direction P). By providing the plurality of holes 17 in the bendable region 13, the structural rigidity of the bendable region 13 may be reduced, which facilitates bending the bendable region 13, that is, compared with a structure without holes, the structure with holes allow bending the bendable region 13 with less force.

It should be understood that the plurality of holes 17 is not limited to being arranged in sequence along the direction perpendicular to the arrangement direction P, but may be arranged in any other suitable way, for example, may be arranged in both the direction perpendicular to the arrangement direction P and the arrangement direction P, for example, be arranged in a sieve-like manner, so that the stress in the bendable region 13 can be uniformly distributed instead of being concentrated. It should also be understood that the holes 17 are not limited to the bendable region 13, and may be disposed across the frame region 12 and the bendable region 13, or across the bendable region 13 and the driving and bonding region 16, or across the frame region 12, the bendable region 13, and the driving and bonding region 16.

In the exemplary embodiment of the present disclosure, the holes are elliptical, and a long axis of the elliptical holes is parallel to the depth direction, which can avoid breakage of the bendable region 13 while reducing the structural rigidity of the bendable region 13. It should be understood that, the shape of the holes is not limited to an elliptical shape but may be any other suitable shape, such as a round shape, as long as there are no obvious stress points on the circumference of the hole.

According to another aspect of the present disclosure, a manufacturing method of the flexible panel is provided based on the above configuration of the flexible panel, and includes cutting the end surface of the edge of the substrate in the frame region by laser cutting to form a groove thereon.

In the exemplary embodiment of the present disclosure, the manufacturing method of the flexible panel further includes attaching a protection layer to the non-display surface of the substrate.

The protection layer has certain flexibility and can support and reinforce the groove, so that the small crack or notch on the wall of the groove will not be further aggravated under the bending stress of the bendable region, thereby improving the reliability of the flexible panel.

In addition, in the exemplary embodiment of the present disclosure, after attaching the protection layer, the manufacturing method of the flexible panel further includes bending the bendable region towards the non-display surface side of the substrate, so as to bend the driving and bonding region to the non-display surface side of the substrate, thereby facilitating realizing a narrow frame of the flexible panel.

In the exemplary embodiment of the present disclosure, by providing the groove at at least one end of the boundary between the frame region and the bendable region on the end surface of the edge of the substrate in the frame region, the inevitable small laser-cut cracks or notches can be mostly formed on the wall portion of the groove while forming the boundary edges between the frame region and the bendable region by laser cutting, thereby reducing the number of the small cracks or notches formed at the boundary edges of the bendable region. After the bendable region is bent, overall aggravation of the small cracks or notches at the boundary edges of the bendable region under the action of bending stress can be reduced accordingly, and the small cracks or notches formed on the wall portion of the groove receive relatively small bending stress, thereby improving the reliability of the flexible panel.

According to another aspect of the present disclosure, a display apparatus is provided, and includes the flexible panel of the above exemplary embodiment.

By adopting the flexible panel of the above exemplary embodiment, the frame width of the display apparatus can be reduced, and the reliability of the display apparatus can also be improved.

The display apparatus provided by the present disclosure may be any product or component having a display function, such as an OLED panel, an OLED television, a display, a mobile phone, and a navigator.

It should be understood that the above embodiments are merely exemplary embodiments employed to illustrate the principles of the present disclosure, and the present disclosure is not limited thereto. Those skilled in the art can make various modifications and improvements without departing from the spirit and essence of the present disclosure, and those modifications and improvements should be considered to fall within the protection scope of the present disclosure.

What is claimed is:

1. A flexible panel, comprising a substrate, which comprises a display region, a frame region and a bendable region, with the frame region surrounding the display region and disposed at the periphery of the display region, and the bendable region disposed on a side of the frame region distal to the display region and abutting on the frame region, there being an interface between the bendable region and the frame region, and both ends of the interface being respectively flush with both ends of the bendable region, wherein the substrate is provided with at least one groove at an edge of the frame region away from the display region, and each of the at least one groove is adjacent to one of the ends of the interface, and is arranged in the substrate, the groove has an opening which is flush with the interface, and a bottom opposite to the opening, and a depth direction, from the opening to the bottom, of the groove is parallel to a direction from the frame region to the display region.

2. The flexible panel according to claim 1, wherein the substrate comprises a display surface and a non-display surface opposite to the display surface, and a protection layer is provided on the non-display surface of the substrate; and the protection layer extends to the groove at the edge of the frame region.

3. The flexible panel according to claim 2, wherein the orthographic projection of the groove on the substrate entirely falls within a range of an orthographic projection of the protection layer on the substrate.

4. The flexible panel according to claim 2, wherein the groove extends from the display surface to the non-display surface of the substrate along a direction parallel to a thickness direction of the substrate.

5. The flexible panel according to claim 1, wherein the bottom of the groove is curved.

6. The flexible panel according to claim 1, wherein a depth of the groove in the depth direction is greater than or equal to 0.5 mm and less than 2 mm.

7. The flexible panel according to claim 1, wherein a width of the opening of the groove along an extension direction of the boundary is greater than or equal to 0.5 mm and less than 2 mm.

8. The flexible panel according to claim 2, wherein a material of the protection layer comprises polyethylene terephthalate, polycarbonate, polyethylene, polyvinyl chloride, polystyrene, polypropylene or nylon.

9. The flexible panel according to claim 2, wherein the substrate further comprises a driving and bonding region disposed on a side of the bendable region distal to the frame region and abutting on the bendable region; and the bendable region is configured to bend towards a side of the non-display surface of the substrate such that the driving and bonding region is positioned at the side of the non-display surface.

10. The flexible panel according to claim 9, wherein a part of the protection layer is provided on the non-display surface of the driving and bonding region, and the protection layer is not provided at the non-display surface of the bendable region.

11. The flexible panel according to claim 1, wherein a plurality of holes are provided in the bendable region along a direction perpendicular to the depth direction.

12. The flexible panel according to claim 11, wherein the plurality of holes are elliptical, and a long axis direction of the elliptical holes is parallel to the depth direction.

13. A display apparatus, comprising the flexible panel according to claim 1.

14. A manufacturing method of the flexible panel according to claim 1, comprising cutting the end of the frame region from the side surface of the substrate by laser cutting to form the at least one groove.

15. The manufacturing method according to claim 14, wherein the substrate comprises a display surface and a non-display surface opposite to the display surface, and a protection layer is provided on the non-display surface of the substrate; and the protection layer extends to the groove at the edge of the frame region, and the manufacturing method further comprises attaching the protection layer to the non-display surface of the substrate.

16. The manufacturing method according to claim 15, wherein the substrate further comprises a driving and bonding region disposed on a side of the bendable region distal to the frame region and abutting on the bendable region; and the bendable region is configured to bend towards a side of the non-display surface of the substrate such that the driving and bonding region is positioned at the side of the non-display surface, and after attaching the protection layer, the manufacturing method further comprises bending the bendable region towards the side of the non-display surface of the substrate.

17. The display apparatus according to claim 13, wherein the substrate comprises a display surface and a non-display surface opposite to the display surface, and a protection layer is provided on the non-display surface of the substrate; and the protection layer extends to the groove at the edge of the frame region.

18. The display apparatus according to claim 17, wherein the orthographic projection of the groove on the substrate entirely falls within a range of an orthographic projection of the protection layer on the substrate.

19. The display apparatus according to claim 17, wherein the groove extends from the display surface to the non-display surface of the substrate along a direction parallel to a thickness direction of the substrate.

* * * * *